United States Patent
Nachman et al.

(10) Patent No.: US 12,467,036 B2
(45) Date of Patent: Nov. 11, 2025

(54) METHODS FOR CULTURING AND DIFFERENTIATING PLURIPOTENT CELLS INTO PROGENITOR OR MATURE MUSCLE CELLS AND COMPOSITION COMPRISING SAID CELLS

(71) Applicant: RAMOT AT TEL AVIV UNIVERSITY LTD., Tel Aviv (IL)

(72) Inventors: Iftach Nachman, Tel Aviv (IL); Gaya Savyon, Tel Aviv (IL)

(73) Assignee: RAMOT AT TEL AVIV UNIVERSITY LTD., Tel Aviv (IL)

( * ) Notice: Subject to any disclaimer, the term of this patent is extended or adjusted under 35 U.S.C. 154(b) by 0 days.

(21) Appl. No.: 18/278,100

(22) PCT Filed: Mar. 20, 2022

(86) PCT No.: PCT/IL2022/050310
§ 371 (c)(1),
(2) Date: Aug. 21, 2023

(87) PCT Pub. No.: WO2022/201147
PCT Pub. Date: Sep. 29, 2022

(65) Prior Publication Data
US 2024/0052315 A1 Feb. 15, 2024

Related U.S. Application Data

(60) Provisional application No. 63/164,047, filed on Mar. 22, 2021.

(51) Int. Cl.
*C12N 5/077* (2010.01)

(52) U.S. Cl.
CPC ........ *C12N 5/0658* (2013.01); *C12N 2500/25* (2013.01); *C12N 2501/105* (2013.01); *C12N 2501/115* (2013.01); *C12N 2501/12* (2013.01); *C12N 2501/155* (2013.01); *C12N 2501/415* (2013.01); *C12N 2506/02* (2013.01)

(58) Field of Classification Search
CPC .................................................. C12N 5/0658
See application file for complete search history.

(56) References Cited

U.S. PATENT DOCUMENTS

| | | |
|---|---|---|
| 2014/0363886 A1 | 12/2014 | Pourquie et al. |
| 2018/0304110 A1 | 10/2018 | Abels et al. |
| 2021/0363485 A1 | 11/2021 | Ikeya et al. |

FOREIGN PATENT DOCUMENTS

| | | | |
|---|---|---|---|
| JP | 2008546410 A2 | 12/2008 | |
| WO | 2007002086 A2 | 1/2007 | |
| WO | 2013030243 A1 | 3/2013 | |
| WO | WO-2016141084 A1 * | 9/2016 | ........... C12N 5/0606 |
| WO | 2020058732 A1 | 3/2020 | |
| WO | 2020058733 A1 | 3/2020 | |
| WO | 2020222239 A1 | 11/2020 | |
| WO | 2020230138 A1 | 11/2020 | |
| WO | 2019177118 A1 | 11/2023 | |

OTHER PUBLICATIONS

Loh et al. (2014, Cell Stem Cell, vol. 14: pp. 237-252 (Year: 2014).*
Brevini et al., 2010, Theriogenology, vol. 74, pp. 544-550 (Year: 2010).*
Paris et al. (2010, Theriogenology, vol. 74, pp. 516-524) (Year: 2010).*
Munoz et al. (2008, Theriogenology, vol. 69, pp. 1159-1164) (Year: 2008).*
Gomez et al. (2010, Theriogenology, vol. 74, pp. 498-515) (Year: 2010).*
Buta et al. (2013, Stem Cell Res., vol. 11, pp. 552-562) (Year: 2013).*
Ramel G, 2020, Fish Classification, pp. 1-46 (Year: 2020).*
Peskin et al., 2020, Current Biology, vol. 30, pp. 2805-2814 (Year: 2020).*
Schmidt et al., 2004, J. Exp. Zoology, vol. 302B, pp. 446-457 (Year: 2004).*
Pour et al. (2019) Emergence and patterning dynamics of mouse definitive endoderm, iScience. Dec. 6, 2021;25 (1):103556. doi: 10.1016/j.isci.2021.103556. PMID: 34988400; PMCID: PMC8693470.
Sagy et al. (2019) Prediction and control of symmetry breaking in embryoid bodies by environment and signal integration, Development. Oct. 15, 2019;146(20):dev181917. doi: 10.1242/dev.181917. PMID: 31575644.
Boxman et al. (2016) Integrated live imaging and molecular profiling of embroid bodies reveals a synchronized progression of early differentiation, Scientific Reports 6:31623. https://doi.org/10.1038/srep31623.
Jiwlawat et al. (2017) Differentiation and sarcomere formation in skeletal mycocytes directly prepared from human induced pluripotent stem cells using a sphere-based culture, Science Direct, 96:70-81. doi: 10.1016/j.diff.2017.07.004. Epub Aug. 1, 2017. PMID: 28915407; PMCID: PMC5669825.
Schmidt et al. (2018) Adult stem cells at work: regenerating skeletal muscle, Cellular & Molecular Life Sciences, 76:2559-2570. doi: 10.1007/s00018-019-03093-6. Epub Apr. 11, 2019. PMID: 30976839; PMCID: PMC6586695.
Veenvliet et al. (2020) Mouse embryonic stem cells self-organize into trunk-like structures with neural tube and somites, Science, 370 (6522):eaba4937. doi: 10.1126/science.aba4937. PMID: 33303587.
Moris (2020) An in vitro model of early anteroposterior organization during human development, Nature, Jun. 2020;582(7812):410-415. doi: 10.1038/s41586-020-2383-9. Epub Jun. 11, 2020. PMID: 32528178.
Chal et al. (2015) Differentiation of pluripotent stem cells to muscle fiber to model Duchenne Muscular Dystrophy, Nat. Biotechnol 33:(9). 962-969. doi:10.1038/nbt.3297.

(Continued)

*Primary Examiner* — Anoop K Singh
*Assistant Examiner* — David A Montanari
(74) *Attorney, Agent, or Firm* — The Roy Gross Law Firm, LLC; Roy D. Gross

(57) ABSTRACT

Provided herein are artificially cultured somites comprising mature muscle progenitor cells and/or mature muscle cells, methods of obtaining same and methods for fast, large scale production of cultured meat comprising mature muscle cells.

12 Claims, 11 Drawing Sheets

(56) References Cited

OTHER PUBLICATIONS

Van den Brink et al. (2020) Single-cell and spatial transcriptomics reveal somitogenesis in gastruloids, Nature,Nature. Jun. 2020;582(7812):405-409. doi: 10.1038/s41586-020-2024-3. Epub Feb. 19, 2020. Erratum in: Nature. Mar. 2020;579 (7799):E11.
Chal et al. (2018) Recapitulating early development of mouse musculoskeletal precursors of the paraxial mesoderm in vitro, Development. Mar. 19, 2018;145(6):dev157339. doi: 10.1242/dev. 157339. PMID: 29555813.
Milasincic et al (1996) Anchorage-dependent control of muscle-specific gene expression in C2C12 mouse myoblasts, In Vitro Cell Dev Biol Anim. Feb. 1996;32(2):90-9. doi: 10.1007/BF02723040. PMID: 8907122.
Sun et al (2013) Alginate-Based Biomaterials for Regenerative Medicine Applications, Materials (Basel) Mar. 26, 2013;6(4):1285-1309. doi: 10.3390/ma6041285. PMID: 28809210; PMCID: PMC5452316.
Andersen et al (2015) 3D Cell Culture in Alginate Hydrogels, Microarrays (Basel) Mar. 24, 2015;4(2):133-61. doi: 10.3390/microarrays4020133. PMID: 27600217; PMCID: PMC4996398.
Modulevsky et al. (2014) Apple derived cellulose scaffolds for 30 mammalian cell culture, PloSOne 9:c47835. doi: 10.1371/journal. pone.0097835. PMID: 24842603; PMCID: PMC4026483.
Fehling et al. (2003) Tracking mesoderm induction and its specification to the hemangioblast during embryonic stem cell differentiation. Development. Sep. 2003;130(17):4217-27. doi: 10.1242/dev.00589. PMID: 12874139.
Chal et al. (2017) Making Muscle: skeletal myogenesis in vivo and in vitro, Development. Jun. 15, 2017;144 (12):2104-2122. doi: 10.1242/dev.151035. PMID: 28634270.
Dai et al. (2014) Analysis of amino acid composition in proteins of animal tissues and foods as pre-column o-phthaldialdehyde derivatives by HPLC with fluorescence detection. J Chromatogr B Analyt Technol Biomed Life Sci. Aug. 1, 2014;964:116-27. doi: 10.1016/j.jchromb.2014.03.025. Epub Mar. 31, 2014. PMID: 24731621.
Vendrell-Pacuas et al. (2000) Determination of inulin in meat products by high-performance liquid chromatography with refractive index detection, Journal Chrometogr A, 881:591-597. doi: 10.1016/s0021-9673(00) 00351-4. PMID: 10905738.
Fisk et al. (2014) The use of gas chromatography to analyze compositional changes of fatty acids in rat liver during pregnancy, Journal Vis Exp, Mar. 13, 2014;(85):51445. doi: 10.3791/51445. PMID: 24686562; PMCID: PMC4151317.
Wang et al. (2017) Gas chromatography-mass spectrometry analysis of effects of dietary fish oil on total fatty acid composition in mouse skin, Sci Rep. Feb. 14, 2017;7:42641. doi: 10.1038/srep42641. PMID: 28195161; PMCID: PMC5307384.
Amirav et al. (2008) Gas chromatography-mass spectrometry with supersonic molecular beams, J Mass Spectrom 43:141-163. DOI: 10.1002/jms.1380.

Bogliotti et al. (2018) Efficient derivation of stable primed pluripotent embryonic stem cells from bovine blastocysts, Proc Natl Acad Sci USA 115:2090-2095. doi: 10.1073/pnas.1716161115. Epub Feb. 9, 2018. PMID: 29440377; PMCID: PMC5834688.
Giotis et al. (2019) Chicken Embryonic Stem Cells are Permissive to Poxvirus Recombinant Vaccine Vectors, Genes (Basel). Mar. 20, 2019;10(3):237. doi: 10.3390/genes10030237. PMID: 30897824; PMCID: PMC6471371.
Loh et al. (2015) Efficient endoderm induction from Human pluripotent stem cells by logically directing signals controlling lineage bifurcations, Cell Stem Cell, 14:237-252. doi: 10.1016/j.stem.2013.12. 007. Epub Jan. 9, 2014. PMID: 24412311; PMCID: PMC4045507.
Nakajima et al. (2019) In vitro generation of somite derivatives from human induced pluripotent stem cells, J of Visualized Experiments, Apr. 25, 2019;(146). doi: 10.3791/59359. PMID: 31081810.
Thurnhofer et al. (2005). A Gas Chromatography/Electron Ionization-Mass Spectrometry-Selected Ion Monitoring Method for Determining the Fatty Acid Pattern in Food after Formation of Fatty Acid Methyl Esters, J. Agric. Food Chem. 2005, 53, 23, 8896-8903. https://doi.org/10.1021/jf051468u.
PCT International Search Report for International Application No. PCT/IL2022/050310, mailed Jul. 4, 2022, 4pp.
PCT Written Opinion for International Application No. PCT/IL2022/050310, mailed Jul. 4, 2022, 5pp.
PCT International Preliminary Report on Patentability for International Application No. PCT/IL2022/050310, issued Sep. 12, 2023, 6pp.
Borchin B, Chen J, Barberi T. Derivation and FACS-mediated purification of PAX3+/PAX7+ skeletal muscle precursors from human pluripotent stem cells. Stem Cell Reports. Nov. 27, 2013;1(6):620-31. (Dec. 1, 2013) doi: 10.1016/j.stemcr.2013.10. 007. PMID: 24371814; PMCID: PMC3871395.
Shelton M, Metz J, Liu J, Carpenedo RL, Demers SP, Stanford WL, Skerjanc IS. Derivation and expansion of PAX7-positive muscle progenitors from human and mouse embryonic stem cells. Stem Cell Reports. Sep. 9, 2014;3(3):516-29 (Sep. 1, 2014). doi: 10.1016/j.stemcr.2014.07.001. Epub Aug. 7, 2014. Erratum in: Stem Cell Reports. Dec. 9, 2014;3 (6):1159. PMID: 25241748; PMCID: PMC4266001.
Chal J, Al Tanoury Z, Hestin M, Gobert B, Aivio S, Hick A, Cherrier T, Nesmith AP, Parker KK, Pourquié O. Generation of human muscle fibers and satellite-like cells from human pluripotent stem cells in vitro. Nat Protoc. Oct. 2016; 11 (10):1833-50. (Sep. 1, 2016) doi: 10.1038/nprot.2016.110. Epub Sep. 1, 2016. PMID: 27583644.
Shelton M, Kocharyan A, Liu J, Skerjanc IS, Stanford WL. Robust generation and expansion of skeletal muscle progenitors and myocytes from human pluripotent stem cells. Methods. May 15, 2016;101:73-84. (May 1, 2016) doi: 10.1016/j.ymeth.2015.09.019. Epub Sep. 25, 2015. PMID: 26404920.
Hosoyama T, McGivern JV, Van Dyke JM, Ebert AD, Suzuki M. Derivation of myogenic progenitors directly from human pluripotent stem cells using a sphere-based culture. Stem Cells Transl Med. May 2014;3(5):564-74. (Mar. 21, 2014) doi: 10.5966/sctm.2013-0143. Epub Mar. 21, 2014. PMID: 24657962; PMCID: PMC4006483.

* cited by examiner

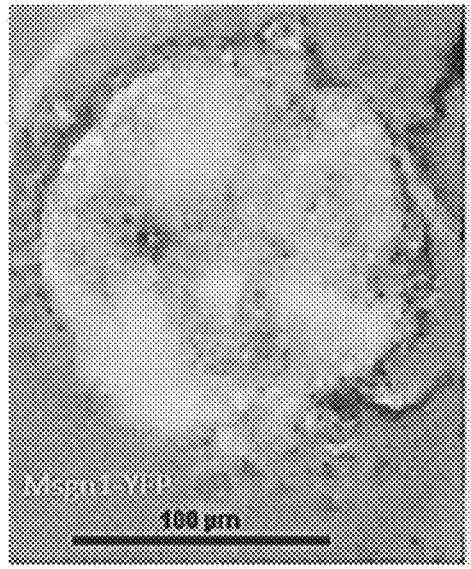 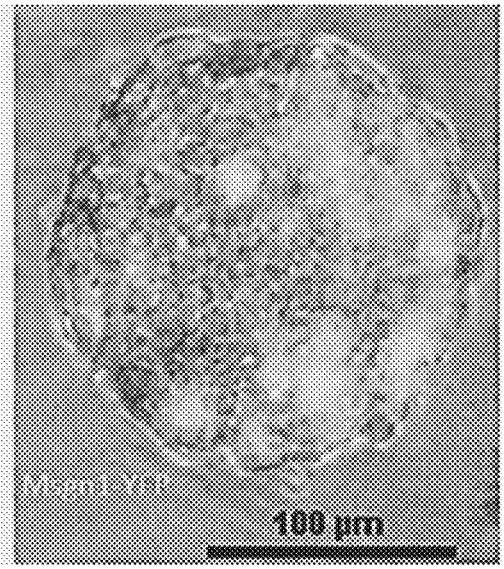
FIG. 4A  FIG. 4B
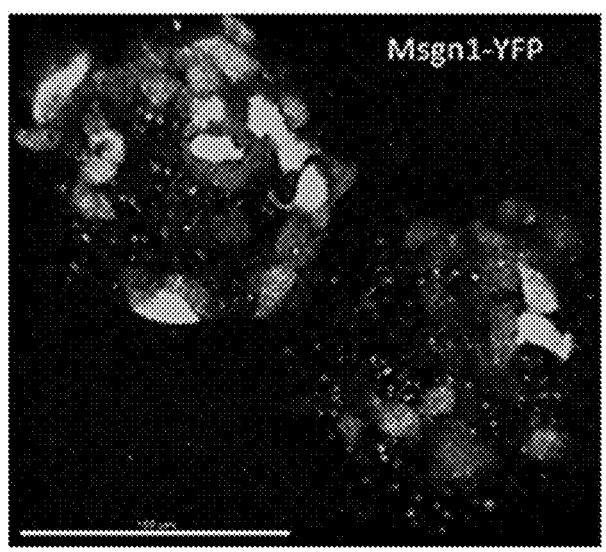
FIG. 4C

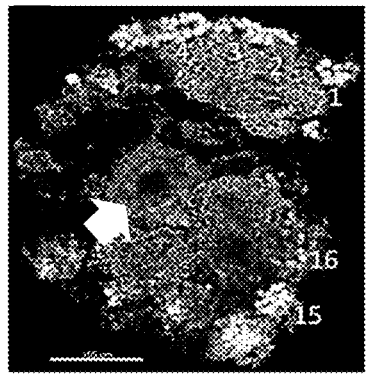 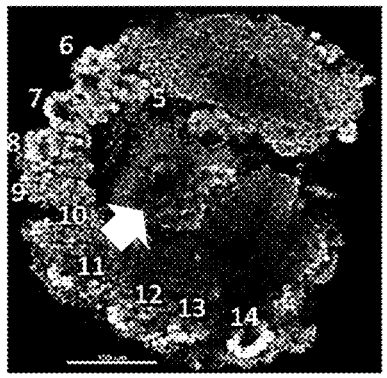 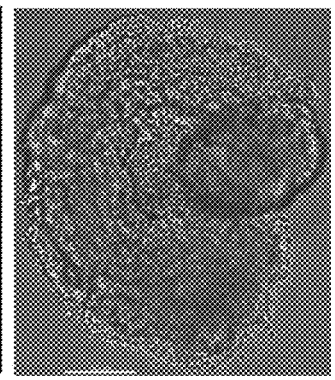
FIG. 5A          FIG. 5B          FIG. 5C
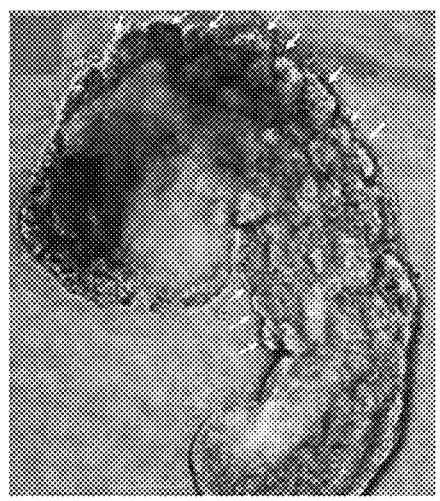
FIG. 5D

METHODS FOR CULTURING AND DIFFERENTIATING PLURIPOTENT CELLS INTO PROGENITOR OR MATURE MUSCLE CELLS AND COMPOSITION COMPRISING SAID CELLS

CROSS REFERENCE TO RELATED APPLICATIONS

This application is a National Phase of PCT Patent Application No. PCT/IL2022/050310 having International filing date of Mar. 20, 2022, which claims the benefit of priority of U.S. Provisional Patent Application No. 63/164,047, filed Mar. 22, 2021, the contents of which are all incorporated herein by reference in their entirety.

FIELD OF THE INVENTION

Provided herein are artificially cultured somites comprising mature muscle progenitor cells and/or mature muscle cells, methods of obtaining same and methods for fast, large scale production of cultured meat comprising mature muscle cells.

BACKGROUND OF THE INVENTION

The meat industry is one of the main causes of environmental and climate degradation. Due to world population growth and increased demand, meat consumption is expected to double between 1999 and 2050. This industry is also heavily associated with the onset of antibiotic resistant and zoonotic diseases. Although a completely plant-based diet can be considered a good alternative to reduce the environmental impact, there is much reason to believe that such a diet will not be adapted voluntarily by most of the world population while meat is still available. Cultured meat is produced in-vitro using cell cultures, offering an alternative production method for meat that is both cheap, more ethical and environmentally friendly, but at the same time keeps the characteristic taste, texture and nutritional value, and even the same biological origin as the animal-derived products. Since skeletal muscles are the main edible tissue used in most animal meat, generation of skeletal muscles in large mass in-vitro is required for the efficient production of cultured meat.

Schmidt et al. (Cellular and Molecular Life Sciences, 76:2559-2570, 2019) discloses regeneration of skeletal muscle from satellite cells, the stem cells of skeletal muscle.

Suzuki et al. (Differentiation, 96: 70-81, 2017) discloses protocol for the derivation of myogenic progenitors directly (without genetic modification) from human pluripotent cells using free-floating spherical culture through a long differentiation period of over 6 weeks, in culture medium supplemented with 100 ng/ml FGF-2 and 100 ng/ml EGF.

Nachman et al. (bioRxiv, 728642, 2019) disclose that the basic rules governing definitive endoderm cells onset from within the mesendoderm progenitors population, involve self-sorting of Sox17+ cells preceded by up-regulation of E-cadherin, wherein a small subpopulation of high-expressing Bra cells are committed to their Sox17+ fate independently of external Wnt signal.

There is an unmet need for efficient, fast and cost-effective process for producing in-vitro muscle cells, preferably within a tissue structure.

SUMMARY OF THE INVENTION

Provided herein is a developmental-path based serum-free, genomic modifications free, protocol for the generation, in culture, of somites, myogenic progenitors, muscle cells and muscle tissue. The protocol includes inducing muscle differentiation within 3D suspended cell cultures, starting from embryonic stem cells. Further provided are cultured somites and somite-like structures comprising muscle cells.

Advantageously, the protocol disclosed herein for the preparation of meat products in culture, combines the self-organization properties of embryonic 3D developmental system at the micro scale, with biotechnological solutions, which render it highly suitable for mass production of meat products and for muscle tissue maturation within organoid cultures. The protocol cures the large gap between existing established muscle differentiation protocols and the scaleup and safety requirements for food production.

Surprisingly, the protocol disclosed herein produces somites, and somite-like structures, which are enclosed structures that give rise to vertebrae and skeletal muscle in the embryo. The production of somites has major benefits. First, production of somite indicates that the protocol (method/process) disclosed herein well mimics the developmental stages that cells undergo during embryonic development from pluripotent (ES) cells to fully differentiated skeletal muscle cells, in a 3D suspension organoid format. As a result, the cultured tissue produced herein includes all the feature of 'real' meat, namely, it is primarily made of muscle tissue but also includes adipose cell, connective tissue, and blood, contributing to the structure and taste of meat produced from livestock. Second, the presence of somites in the production process results in intra-organoid signaling, which promotes the required differentiation independently of external supplements, and hence only little amounts of growth factors are used for supplementing the culture medium (for example, in the order of about 10 ng/ml). Accordingly, the protocol disclosed herein is cost-effective, since it does not require large quantities of costly growth factors (that typically create the major expenditure in the production of cultured tissues).

Unexpectedly, applying the protocol disclosed herein on pluripotent cells results with the production of myogenic progenitors in a short time frame, for example, in only two weeks, using no more than about 20 ng/ml FGF-2 and EGF growth factors.

Moreover, as the developmental process, including somites formation and muscle formation, is highly preserved among vertebrates—the protocol disclosed herein which follows embryonic development guidelines, can be successfully implemented to produce cultured meat from progenitor cells of any livestock species.

Finally, the present protocol initiates with stem cell cells and enables differentiation in suspension (e.g. in large scale bioreactors or even in conventional steerers), until obtaining myogenic progenitors.

According to some embodiments, in view of the above, the protocol disclosed herein being fast, cost-effective, reproducible, suitable for large scale bioreactors, and yet producing cultured meat that includes the feature of livestock meat, is highly appropriate for industrial manufacturing of cultured myogenic progenitors and cultured meat.

The disclosed protocol is composed of a series of steps, where each step attempts to efficiently mimic the in-vivo signaling environment sensed by the myogenic lineage at the relevant developmental stage, e.g. mesoderm, pre-somitic mesoderm, myogenic progenitors and mature muscle cells. The first step of the protocol includes aggregating mES cells under a first medium, following the differentiation of the aggregate in suspension, where the medium may be modified between some consecutive steps, as further detailed and exemplified hereinbelow.

There is provided, according to some embodiments, a method for generating somites, the method comprising:

(a) suspending embryonic stem cells in culture medium to obtain essentially spheric aggregates;

(b) adding to the culture medium at least one Wnt activator to obtain aggregates comprising mesodermal and endodermal cells;

(c) removing the Wnt activator;

(d) observing the morphology of the aggregates comprising the mesodermal and endodermal cells and adding extracellular matrix or components thereof, when said aggregates have ovoid-like morphology, to obtain aggregates comprising paraxial mesoderm; and (e) incubating the aggregates of step (d), for 10 to 48 hours, thereby obtaining aggregates comprising a plurality of somites.

According to some embodiments, the method further comprises adding to the culture medium of step (a) one or more of insulin, Knock-out Serum Replacement, transferrin-selenium and BMP4.

According to some embodiments, the Wnt activator is selected from the group consisting of: Chir99021, Wnt3a and Rspo3.

According to some embodiments, adding to the culture medium at least one Wnt activator is carried out within 12 to 36 hours after obtaining said essentially spheric aggregates.

According to some embodiments, removing the Wnt activator is carried out within 8 to 36 hours after the addition thereof. According to some embodiments, removing the Wnt activator is carried out within 12 to 36 hours after the addition thereof.

According to some embodiments, the method may further include adding at least one Nodal inhibitor to the culture medium following appearance of the aggregates comprising said mesodermal and endodermal cells.

According to some embodiments, the amount of the extracellular matrix or components thereof is within the range of about 1 to 15% vol/vol.

According to some embodiments, the method may further include adding in step (d) at least one compound selected from the group consisting of: Wnt activator and BMP inhibitor.

According to some embodiments, the method may further include removing the extracellular matrix or components thereof, following obtaining the plurality of somites.

According to some embodiments, there is provided method for generating myogenic progenitors, the method comprising:

(a) propagating embryonic stem cells in culture medium to obtain spheric aggregates;

(b) adding to the culture medium at least one Wnt activator to obtain aggregates comprising mesodermal and endodermal cells;

(c) removing the Wnt activator;

(d) observing the morphology of the aggregates comprising the mesodermal and endodermal cells and adding extracellular matrix or components thereof when said aggregates have ovoid-like morphology, to obtain aggregates comprising paraxial mesoderm;

(e) incubating the aggregates of step (d), for 10 to 48 hours, thereby obtaining aggregates comprising a plurality of somites; and (f) adding one or more growth factors to the medium in step (e), the concentration of which is below 30 ng/ml, thereby obtaining myogenic progenitors.

According to some embodiments, the one or more growth factors may include HGF, IGF and FGF2.

According to some embodiments, step (a) may be carried out in suspension.

According to some embodiments, the method may further include adding to the medium of step (d) at least one of compound selected from: BMP inhibitor and Wnt activator.

According to some embodiments, the Wnt activator is selected from the group consisting of: Chir99021, Rspo3 and Wnt3a.

According to some embodiments, adding to the culture medium at least one Wnt activator is carried out within 12 to 36 hours after obtaining said spheric aggregates.

According to some embodiments, the method may further include removal of the extracellular matrix (ECM) or components thereof prior to step (e). According to some embodiments, the method may further include removal of the extracellular matrix or components thereof prior to step (f).

According to some embodiments, the concentration of each growth factor is within the range of about 1 to 25 ng/ml.

According to some embodiments, the one or more growth factors is IGF, and the concentration of IGF is within the range of about 1 to 5 ng/ml.

According to some embodiments, the myogenic progenitors comprise myoblasts and myocytes.

According to some embodiments, the method may further include adding to the culture medium of step (a) one or more of insulin, Knock-out Serum Replacement, transferrin-selenium and BMP4.

According to some embodiments, removing the Wnt activator may be carried out within the range of about 8 to 36 hours. According to some embodiments, removing the Wnt activator may be carried out within about 12 to 36 hours after the addition thereof.

According to some embodiments, the method may further include adding at least one Nodal inhibitor to the culture medium following appearance of the aggregates comprising said mesodermal and endodermal cells.

According to some embodiments, the amount of the extracellular matrix or components thereof may be within the range of about 1 to 15% vol/vol.

According to some embodiments, there are provided cultured somites which include mature muscle progenitor cells and/or mature muscle cells, prepare by the methods disclosed herein.

Other objects, features and advantages of the present invention will become clear from the following description, examples and drawings.

Certain embodiments of the present disclosure may include some, all, or none of the above advantages. One or more other technical advantages may be readily apparent to those skilled in the art from the figures, descriptions, and claims included herein. Moreover, while specific advantages have been enumerated above, various embodiments may include all, some, or none of the enumerated advantages.

BRIEF DESCRIPTION OF THE DRAWINGS

Some embodiments of the disclosure are described herein with reference to the accompanying figures. The description, together with the figures, makes apparent to a person having ordinary skill in the art how some embodiments may be practiced. The figures are for the purpose of illustrative description and no attempt is made to show structural details of an embodiment in more detail than is necessary for a fundamental understanding of the disclosure. For the sake of clarity, some objects depicted in the figures are not to scale.

In the Figures:

FIGS. 4A-4C represent images of aggregates obtained during Step 3. Msgn1-YFP (bright regions) indicates the presence of pPSM. Scale bar 100 µm.

FIG. 5A-5C represent images of an elongated aggregate obtained at the end of Step 4, stained with Somites marker (Pax3) and imaged at two z-sections (left, center) and brightfield (right). Somites are numbered. Thick white arrows point at the Sox17-RFP positive region, marking endoderm. Scale bar 100 µm.

FIG. 5D represents an image of an elongated aggregate obtained at the end of Step 4, with Brachyury-GFP and Sox17-RFP positive regions, marking mesoderm and endoderm, respectively. Somites are indicated by small white arrows pointing circular structures at the anterior region. Scale bar 100 µm.

DETAILED DESCRIPTION

Figure 1A:
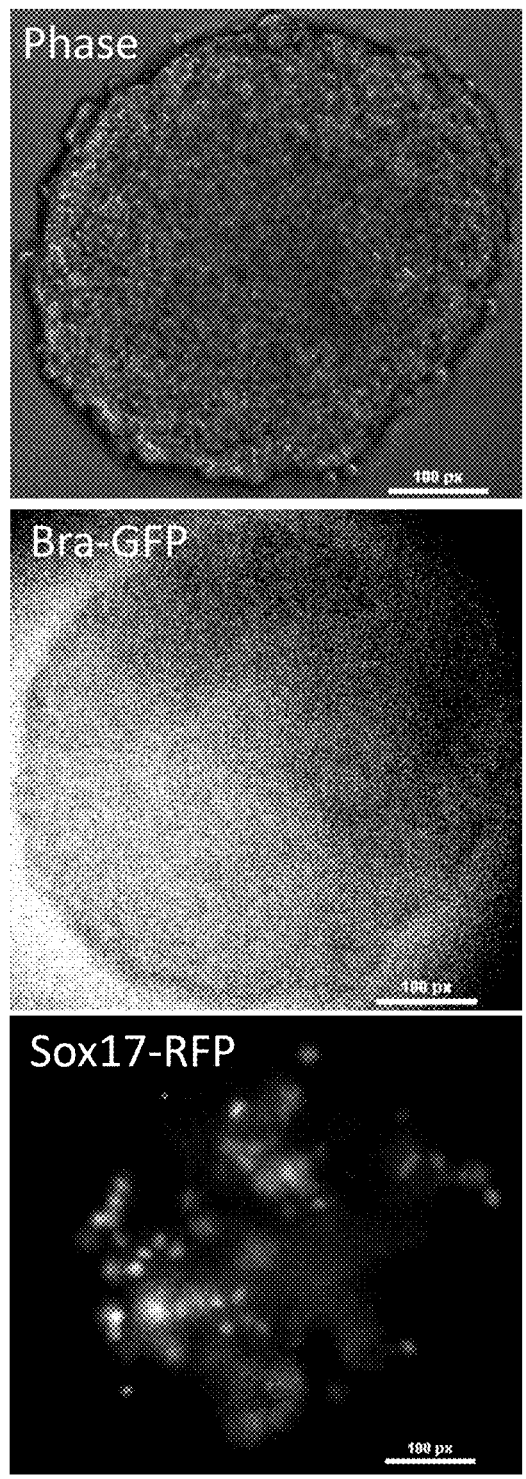
FIG. 1A shows an aggregate containing mesodermal cells (Brachyury-positive cells (Bra-GFP); top panel) and endodermal cells (Sox17-positive cells (Sox-RFP); middle panel), obtained from ESC cells seeded in plates following Step 2 in the disclosed protocol.

The principles, uses and implementations of the teachings herein may be better understood with reference to the accompanying description and figures. Upon perusal of the description and figures present herein, one skilled in the art will be able to implement the teachings herein without undue effort or experimentation. In the figures, same reference numerals refer to same parts throughout. In the figures, same reference numerals refer to same parts throughout.

While cell-based meat science has evolved in the past few years, obtaining a large mass of skeletal muscle tissue, is a major challenge. For this to be met, a scalable and efficient proliferation and muscle differentiation process is needed. While suspension culture methods offer the greatest promise for scaleup, they pose a hurdle toward muscle differentiation, due to the current need in physical anchoring points.

In recent years, tremendous advances have been made in 3D suspension culture of small organ-like 3D structures (termed organoids), that mimic various aspects of the original organ, including cell composition. Many of the organoid systems start from embryonic stem cells, offering a complete start-to-finish differentiation process, mimicking the embryonic process to some extent, with no need to repeatedly harvest the starting cell population from animals.

In brief, there two main approaches for producing cultured meat: (1) starting from satellite cells—the relative benefit of cultured satellite cells is that their differentiation to muscle cells is comparatively fast and easy. However, as satellite cells are post mitotic (terminally differentiated) they do not proliferate and hence their use as the starting cells is not feasible for mass production; (2) starting from pluripotent cells (embryonic stem cells)—the benefit of using pluripotent cell is their outstanding long-term proliferative potential and their ability to be driven towards differentiate, upon being exposed to suitable conditions. However, the differentiation process of these cells to mature muscle cells takes very long time (over a month, usually, over 6 weeks).

A major challenge is the efficient growth of large mass of muscle cells, preferably within a tissue context, namely, cultured meat that resembles the contents of meat produce which is mainly composed of muscle tissue (about 90%) and further includes a combination of adipose (fat) cells, blood and connective tissue. The current solutions mostly rely on adult progenitor cells (e.g. satellite cells) as a starting point, and single cell type differentiation protocols, limiting both the proliferation capacity and the resemblance to full tissue structure. A scalable and efficient proliferation and muscle differentiation process is therefore required.

According to some embodiments, utilizing the protocol as disclosed herein allows producing cultured meat that includes the various component of meat produce, primarily since the protocol produces somitic cells.

The term "protocol" as used herein is interchangeable with the term "method" or "process" in the context of a protocol for obtaining somites and 3D edible organoids.

Muscle differentiation protocols known to date are either based on 2D adherent cultures, or are not efficient. Many protocols use serum and/or genetic modifications to activate certain key genes. Some use partially differentiated cells (such as satellite cells) as the starting cell type, which may place limits on the proliferation rate and capacity of these starting cells. The protocol disclosed herein combines signaling-only differentiation protocols, with suspended 3D culturing systems (starting from ES cells) resulting in an efficient muscle differentiation method which is scalable and free from serum and other animal-derived factors. The use of pluripotent stem cells removes the need to repeatedly harvest the starting cell population from animals.

Thus, according to some embodiments, there is provided a method for generating somites, the method comprising:
(a) suspending embryonic stem cells in culture medium to obtain essentially or substantially spheric aggregates;
(b) adding to the culture medium at least one Wnt activator to obtain aggregates comprising mesodermal and endodermal cells;
(c) removing the Wnt activator;
(d) observing the morphology of the aggregates which includes the mesodermal and endodermal cells, and adding extracellular matrix (ECM) or components thereof, when the aggregates have ovoid-like morphology, to obtain aggregates which include paraxial mesoderm; and
(e) incubating the aggregates of step (d), for 10 to 48 hours, thereby obtaining aggregates including/having a plurality of somites.

According to some embodiments, the terms "propagating" and "suspending" as used herein refer to culturing in 2-D culture or in suspension (3-D) under conditions that are suitable for maintaining proliferation and pluripotency of the pluripotent cells. Cell proliferation generally increases the size of the aggregates forming larger aggregates, which can be routinely mechanically or enzymatically dissociated into smaller aggregates to maintain cell proliferation within the culture and increase numbers of cells. Commonly, cells cultured within aggregates in maintenance culture maintain markers of pluripotency. Pluripotency can be determined, in part, by assessing pluripotency characteristics of the cells. Pluripotency characteristics include, but are not limited to: (i) pluripotent stem cell morphology; (ii) the potential for unlimited self-renewal; (iii) expression of pluripotent stem cell markers including, but not limited to SSEA1 (mouse only), SSEA3/4, SSEA5, TRA1-60/81, TRA1-85, TRA2-54, GCTM-2, TG343, TG30, CD9, CD29, CD133/prominin, CD140a, CD56, CD73, CD90, CD105, OCT4, NANOG, SOX2, CD30 and/or CD50; (iv) ability to differentiate to all three somatic lineages (ectoderm, mesoderm and endoderm); (v) teratoma formation consisting of the three somatic lineages; and (vi) formation of embryoid bodies consisting of cells from the three somatic lineages. The pluripotent stem cell aggregates require further differentiation cues to induce differentiation.

According to some embodiments, at the end of step (a) of the method, a plurality of spheric aggregates are obtained. According to some embodiments, the plurality of spheric aggregates obtained at the end of step (a) include at least 50 spheric aggregates, at least 100 spheric aggregates, at least 150 spheric aggregates, at least 200 spheric aggregates, at least 250 spheric aggregates, at least 300 spheric aggregates, about 300 spheric aggregates. Each possibility represents a separate embodiment.

As used herein, the term "about" may be used to specify a value of a quantity or parameter (e.g. amount, percentage, length) within a continuous range of values in the neighborhood of (and including) a given (stated) value. According to some embodiments, "about" may specify the value of a parameter to be between 80% and 120% of the given value. According to some embodiments, "about" may specify the value of a parameter to be between 90% and 110% of the given value. According to some embodiments, "about" may specify the value of a parameter to be between 95% and 105% of the given value.

The terms "pluripotent stem cell", "embryonic stem cell" and ESC as used herein are interchangeable.

According to some embodiments, the embryonic stem cells are derived from livestock. According to some embodiments, the embryonic stem cells are derived from animals selected from the groups consisting of cattle, sheep, goats, fish, swine and poultry.

It is to be understood, that the embryonic stem cell (ESC) used herein are free of genetic engineering.

Figure 2A:
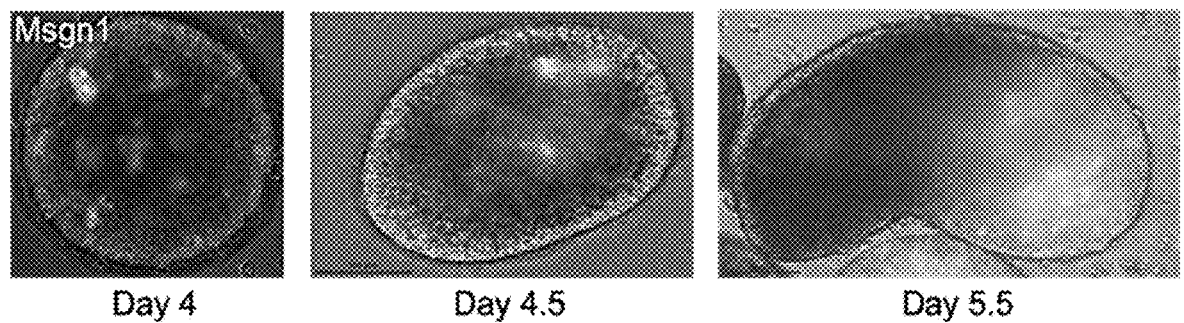
FIG. 2A represents posterior presomitic mesoderm (pPSM) spatio-temporal pattern in mouse 3D organoids formed during Step 3 of the disclosed protocol. The organoids are aggregated from Msgn1-YFP mES cells and cultured for 6 days in suspension. Scale bar 100 µm.
Figure 2B:
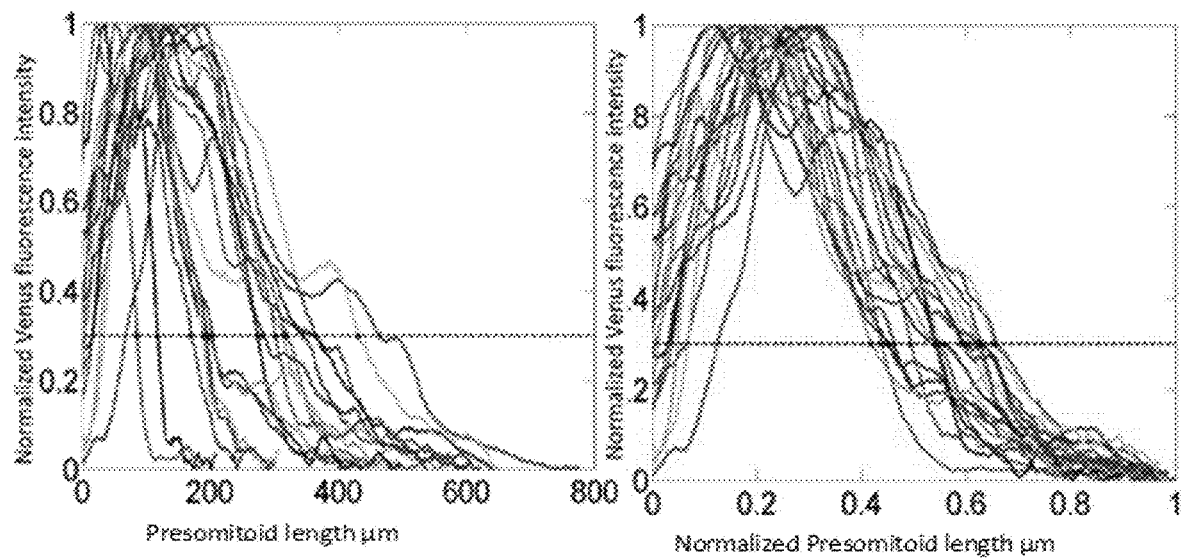
FIG. 2B represents the fluorescence level plotted against absolute organoid length (left panel) and against normalized organoid length (right panel) measured for 20 organoids formed during Step 3 of the disclosed protocol. Msgn1-YFP marks pPSM.

Pluripotent stem cell morphology has classical morphological features of an embryonic stem cell. Normal embryonic stem cell morphology is characterized by being round (spheric) and small in shape, with a high nucleus-to-cytoplasm ratio, the notable presence of nucleoli, and typical inter-cell spacing. In contrast, aggregates comprising mesodermal and endodermal cells, as obtained by step (b) of the method disclosed herein have ovoid-like morphology, as demonstrated hereinbelow, for example, as shown in FIG. 2A, day 4.5.

According to some embodiments, step (a) is carried out on culture plates (e.g. Petri dishes and/or multi-well plates). Thus, according to some embodiments, the embryonic stem cells form an adherent cell culture, in culture plate(s). According to some embodiments, the method may further include adding to the culture medium of step (a) one or more of insulin, transferrin-selenium, Knock-out Serum Replacement and BMP4. Each possibility is a separate embodiment.

The step of adding to the culture medium of step (a) one or more of insulin, transferrin-selenium, Knock-out Serum Replacement and BMP4 is carried out in order to increase the fraction of PSM cells within the organoids/aggregates. Hence, supplementing the culture medium of step (a) with insulin, transferrin-selenium, Knock-out Serum Replacement and/or BMP4 improves the quality of the protocol disclosed herein.

According to some embodiments, insulin may be added to the culture medium. According to some embodiments, the concentration of insulin added to the culture medium is within the range of 5 to 15 μl/ml, 5 to 13 μl/ml, 7 to 13 μl/ml, 7 to 12 μl/ml, 5 to 12 μl/ml, about 7 μl/ml, or about 10 μl/ml. Each possibility represents a separate embodiment.

According to some embodiments, transferrin-selenium may be added to the culture medium. According to some embodiments, the concentration of transferrin-selenium added to the culture medium is within the range of 0.1% to 5%, 0.2% to 4%, 0.2% to 3%, 0.5% to 3%, 0.5% to 2%, 0.8% to 3%, 0.8% to 2%, about 2%, about 1.5% or about 1%. Each possibility represents a separate embodiment.

According to some embodiments, BMP4 may be added to the culture medium. According to some embodiments, the concentration of BMP4 added to the culture medium is within the range of 5 to 15 μl/ml, 5 to 13 μl/ml, 7 to 13 μl/ml, 7 to 12 µl/ml, 5 to 12 µl/ml, about 7 µl/ml, or about 10 µl/ml. Each possibility represents a separate embodiment.

According to some embodiments, Knock-Out Serum Replacement (KSR) may be added to the culture medium.

According to some embodiments, step (a) may be carried out in N2B27 medium. According to some embodiments, step (a) may be carried out is culture medium supplemented with at least one of Knock-out Serum Replacement (KSR), bovine serum albumin (BSA), insulin and BMP4. According to some embodiments, step (a) may be carried out in culture medium supplemented with low concentrations of insulin. According to some embodiments, the low concentrations of insulin are within the range of about 1 to 25 µg/ml insulin, about 1 to 20 µg/ml insulin, about 1 to 15 µg/ml insulin, about 5 to 25 µg/ml insulin, or about 5 to 20 µg/ml insulin. Each possibility represents a separate embodiment.

According to some embodiments, the cells are kept in suspension by rotating the plate.

According to some embodiments, the Wnt activator added in step (b) is selected from the group consisting of: Chir99021, Rspo3 and Wnt3a. Each possibility is a separate embodiment.

According to some embodiments, the Wnt activator added in step (b) is in a concentration within the range of about 0.5 to 10 µM, 0.5 to 7 µM, 0.7 to 10 µM, 0.7 to 7 µM, 1 to 7 µM, or 1 to 5 µM. Each possibility represents a separate embodiment.

According to some embodiments, the Wnt activator is added in step (b) about 24 hours following the formation of multiple aggregates in culture. According to some embodiments, the Wnt activator is added in step (b) about 24 hours following the formation of multiple aggregates in suspension.

According to some embodiments, the Wnt activator is removed from the culture medium within about a day after being added to the medium, within 8 to 36 hours after being added within 12 to 36 hours after being added, within 18 to 30 hours after being added, within about 24 hours after being added. Each possibility represents a separate embodiment. In some embodiments, removal of the Wnt activator may be obtained by substituting the culture medium with a similar medium lacking the Wnt activator.

According to some embodiments, the method may further include adding at least one Nodal inhibitor to the culture medium following appearance of the aggregates comprising said mesodermal and endodermal cells. By supplementing the medium with the at least one Nodal inhibitor, helps repressing the expansion of non-somatic cell populations, such as, definitive endoderm.

According to some embodiments, the Nodal inhibitor is selected from the group consisting of: SB-431542 and SB-505124. Each possibility is a separate embodiment. According to some embodiments, the Nodal inhibitor added in step (b) is in a concentration within the range of 200 nM 50 700 nM, 5 to 15 µM, 5 to 12 µM, 7 to 15 µM, 7 to 12 µM, about 7 µM, or about 10 µM. Each possibility represents a separate embodiment.

According to some embodiments, a scaffolding (extracellular) matrix, or components thereof, are incorporated into the aggregates in the suspension. According to some embodiments, the culture medium comprises low concentrations of extracellular matrix (ECM) or components thereof, specifically, less than about 20% vol/vol, less than 15% vol/vol, less than 10% vol/vol, less than 8% vol/vol, less than 5% vol/vol. According to some embodiments, the amount of ECM in the culture medium is within the range of about 1% to 15% vol/vol. According to some embodiments, the amount of ECM in the culture medium is within the range of 1% to 12% vol/vol. According to some embodiments, the amount of ECM in the culture medium is within the range of about 2% to 12% vol/vol. According to some embodiments, the amount of ECM in the culture medium is within the range of about 3% to 13% vol/vol. According to some embodiments, the amount of ECM in the culture medium is within the range of about 2% to 12% vol/vol. According to some embodiments, the amount of ECM in the culture medium is within the range of about 3% to 11% vol/vol. According to some embodiments, the amount of ECM in the culture medium is within the range of about 3% to 10% vol/vol. According to some embodiments, the amount of ECM in the culture medium is within the range of about 4% to 10% vol/vol. According to some embodiments, the amount of ECM in the culture medium is within the range of about 5% to 10% vol/vol.

According to some embodiments, the ECM comprise Matrigel™. According to some embodiments, the culture medium comprises components of the ECM. According to some embodiments, the components of the ECM include, but are not limited to, fibronectin, collagen and laminin.

According to some embodiments, the addition of ECM or components thereof is performed after observing aggregates having ovoid-like morphology. Thus, the protocol is not based on random/constant timing for adding the ECM or its components, since it has been found that the right timing changes from batch to batch, and surprisingly, it is best to add ECM or its components based on observation of the aggregates, wherein the ideal timing is when the aggregates present an ovoid-like morphology.

Following the addition of ECM or components thereof, paraxial mesodermal cells are formed. According to some embodiments, the ECM or components thereof are removed from the culture medium following the formation of paraxial mesodermal cells within the aggregates. Removal of ECM or its components from the culture medium confers an additional advantage to the disclosed protocol: it reduces the overall cost of the entire protocol while not compromising on the desired outcome.

According to some embodiments, there is also the option to maintain in the medium the ECM or components thereof.

According to some embodiments, the method may further include adding at least one Wnt activator and/or at least one BMP inhibitor to the medium in step (d). Thus, according to some embodiments, the medium in step (d) may further include at least one Wnt activator and/or at least one BMP inhibitor. Supplementing the medium in step (d), namely, a medium including the ECM or components thereof, with Wnt activator(s) and/or BMP inhibitor(s) is beneficial as it can improve the yield of somite formation. Furthermore, the addition of Wnt activator(s) and/or BMP inhibitor(s) to the medium at this stage reduces the overall viscosity of the medium thereby facilitating growth in a mixed suspension condition, which is especially suitable for industrial scale bioreactors.

According to some embodiments, the at least one Wnt activator is selected from Chir99201 and Rspo3. Each possibility represents a separate embodiment.

According to some embodiments, the at least one BMP inhibitor is selected from LDN193189 and Noggin. Each possibility represents a separate embodiment.

According to some embodiments, a plurality of organoids are embedded at the end of the differentiation process, into a scaffolding matrix.

The terms "aggregates", "3D organoids" and "organoids" as used herein, are interchangeable.

According to some embodiments, there is provided a method for generating myogenic progenitor, the method comprising the steps recited above for obtaining somites and further comprises the steps of: (e) incubating the aggregates of step (d), for 10 to 48 hours, thereby obtaining aggregates comprising a plurality of somites; and (f) adding one or more growth factors, the concentration of which is below about 30 ng/ml, thereby obtaining myogenic progenitors.

According to some embodiments, the one or more growth factors include, but are not limited to, HGF, IGF and FGF2, wherein the concentration on the one or more growth factor is within the range of about 1 to 25 ng/ml. According to some embodiments, the medium of step (f) is further supplemented with at least one of compound selected from: BMP inhibitor and Wnt activator.

According to some embodiments, the one or more growth factors may include HGF. According to some embodiments, the concentration of HGF added to the medium of step (f) is within the range of about 5 to 15 µl/ml, 5 to 13 µl/ml, 7 to 13 µl/ml, 7 to 12 µl/ml, 5 to 12 µl/ml, about 7 µl/ml, or about 10 µl/ml. Each possibility represents a separate embodiment.

According to some embodiments, the one or more growth factors may include IGF. According to some embodiments, the concentration of IGF added to the medium of step (f) is within the range of about 0.5 to 5 µl/ml, 0.5 to 3 µl/ml, 0.7 to 3 µl/ml, 0.7 to 2.5 µl/ml, 1 to 2.5 µl/ml, about 2.5 µl/ml, or about 2 µl/ml. Each possibility represents a separate embodiment.

According to some embodiments, the one or more growth factors may include FGF2. According to some embodiments, the concentration of FGF2 added to the medium of step (f) may be within the range of about 10 to 25 µl/ml, 12 to 25 µl/ml, 12 to 23 µl/ml, 15 to 25 µl/ml, 15 to 23 µl/ml, about 25 µl/ml, or about 20 µl/ml. Each possibility represents a separate embodiment.

According to some embodiments, the obtained myogenic progenitors comprise myoblasts, myocytes and satellite cells.

Maturation of muscle cells has been demonstrated to depend on anchoring of the cells on (semi-)rigid surfaces, likely mimicking anchoring to bone structures. Accordingly, the method disclosed herein may further include the step of embedding the late-stage organoids in edible matrix, in an attempt to generate anchor points of the maturation of myocytes. Optional matrices include, but are not limited to, mycelium, alginate and cellulose (e.g. from decellularized apples).

According to some embodiments, the method further comprising monitoring differentiation in the suspended 3D-organoids.

According to some embodiments, the monitoring may be carried out using at least one technique selected from the group consisting of: high throughput two-photon 3D imaging, live imaging with GFP-tagged developmental markers (such as Msgn1, Pax3, Pax7), and immunostaining against marker proteins.

Imaging is also used to monitor the cell composition at the different phases of the process for the purpose of identifying efficiency bottlenecks in terms of the fraction of muscle lineage cells in the organoid.

According to some embodiments, the method may further include characterizing the cell populations in the 3D-organoids at different time points.

According to some embodiments, the method may further include characterizing the spatial organization of the cell populations in the 3D-organoids at different time points.

According to some embodiments, characterizing the cell populations in the 3-D organoids may be carried out by various methods, including, but not limited to, RT-PCR and FISH.

According to some embodiments, the method may further include nutritional profiling the 3-D organoids. For nutritional profiling various approaches can be applied, such as, GC, HPLC, and GC-MS with cold EI.

According to some embodiments, the 3D organoids are in a format selected from the group consisting of hanging drops, rotating suspension, free suspension, patterned microwells and high-throughput 96-wells.

According to some embodiments, there are provided cultured somites and cultured tissues comprising mature muscle progenitor cells or mature muscle cells, obtained by the protocols disclosed herein.

In the description and claims of the application, the words "include" and "have", and forms thereof, are not limited to members in a list with which the words may be associated.

One skilled in the art readily appreciates that the present invention is well adapted to carry out the objects and obtain the ends and advantages mentioned, as well as those inherent therein. The examples provided herein are representative of preferred embodiments, are exemplary, and are not intended as limitations on the scope of the invention.

EXAMPLES

Example 1: Protocol for Generation of Somites and Myogenic Progenitor

The 3D differentiation model disclosed herein forms basis for industry-level scaleup processes and adaptation to other edible species. A full suspension, cell-cluster based protocol as disclosed herein can be incorporated in bioreactors of unlimited size. Moreover, the protocol is serum free, and does not involve genetic modifications, rendering it suitable for industrial processing.

Figure 1B:
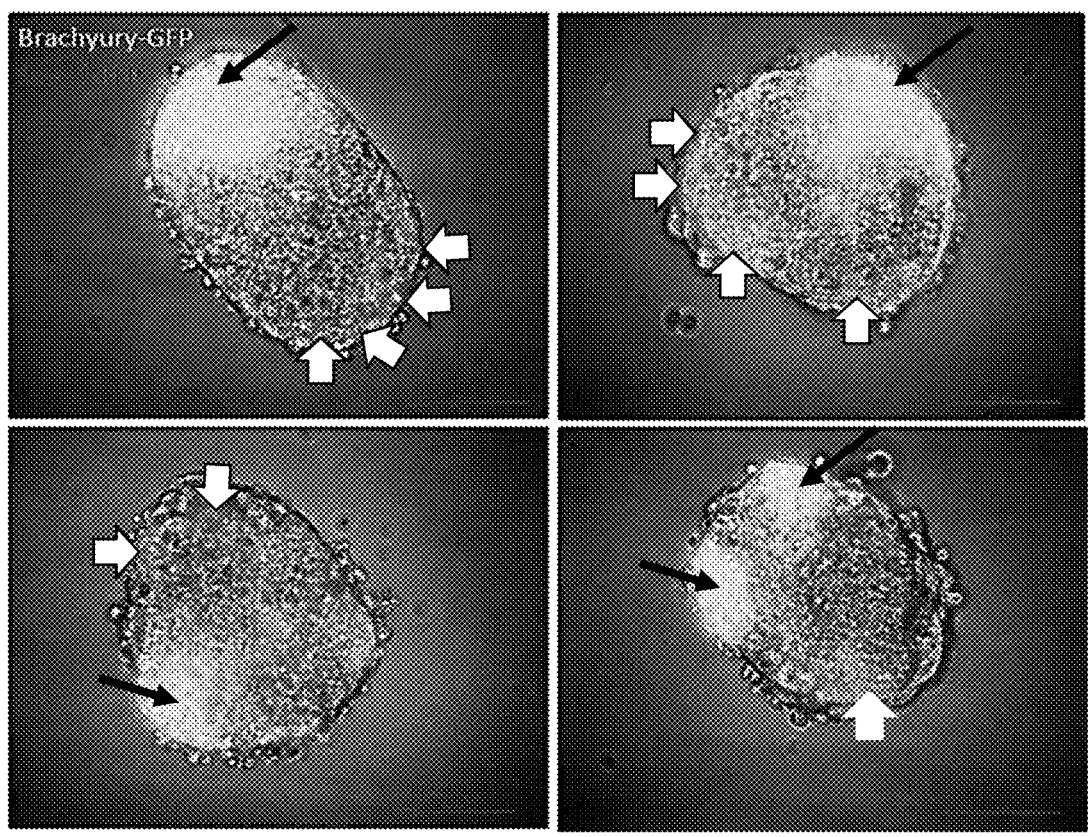
FIG. 1B shows aggregates containing mesodermal cells (Brachyury-positive cells; narrow arrows) and endodermal cells (Sox17-positive cells; thick white arrows), obtained from ESC cells in suspension, following Step 2 in the disclosed protocol.

The following protocol provides myogenic progenitor in several days. The protocol includes the following steps:

Step 1—ESC aggregate formation: aggregate spheres of 50-300 ESCs were obtained by seeding the ESCs in an N2B27 or NDIFF medium (e.g. at an ULA u-bottom plate; FIG. 1A). The medium may be supplemented with one or more of Insulin (e.g. 10 µl/ml), transferrin-selenium (e.g. 1%) and BMP4 (e.g. 10 ng/ml). Aggregate spheres of 20-300 ESCs were also obtained by culturing the ESCs at a density of 10K-30K cells/ml in N2B27 medium supplemented with 1-5% Knock-out Serum Replacement (KSR), 10-30 µg/ml bovine serum albumin (BSA), low concentrations of 5-15 µg/ml insulin and 5-15 ng/ml BMP4 (FIG. 1B). Preferably, the cells should be kept in suspension, e.g., by rotating the plate at speed of 100-300 rpm.

Step 2—germ layers formation: this step was carried out about one day after multiple aggregates were formed, or after multiple floating cell-aggregate spheres with diameter between 50-200 µm were generated, in each well. In Step 2 the Wnt pathway was activated by adding to the culture medium Wnt activator Chir99021 (1-5 µM) or Rspo3 (10-30 ng/ml) or Wnt3a (50-300 ng/ml) for approximately 12 to 24 hours. Thereafter, the medium containing the Wnt activator was removed and replaced with a fresh medium, devoid of Wnt activator.

The addition of Wnt activator pushes the differentiation towards the mesodermal lineage, and as a result, at the end of this step mesodermal cells (marked by Brachyury-GFP; e.g. FIG. 1B—thin arrows) and endodermal cells (marked with Sox17 RFP; FIG. 1B, wide arrows) were visible in the aggregate, as shown in FIGS. 1A and 1B. It is noted that the morphology of aggregates obtained at the end of step 2 and germ layers formation, is typically an ovoid-like morphology as can be seen in FIG. 1B.

Step 3A—paraxial mesoderm (PSM, also termed presomitic mesoderm) formation: PSM cells were visible within 1-2 days after the first mesodermal cells (Brachyury-positive cells) appeared, and could be identified using the marker Mesogenin1 (Msgn1) (FIGS. 2A-2E and FIGS. 4A-4C). As shown in FIG. 2A, the cells initially spread randomly in the aggregate (FIG. 2A, left panel, Day 4) and gradually concentrate on one location of the aggregate.

Figure 2C:
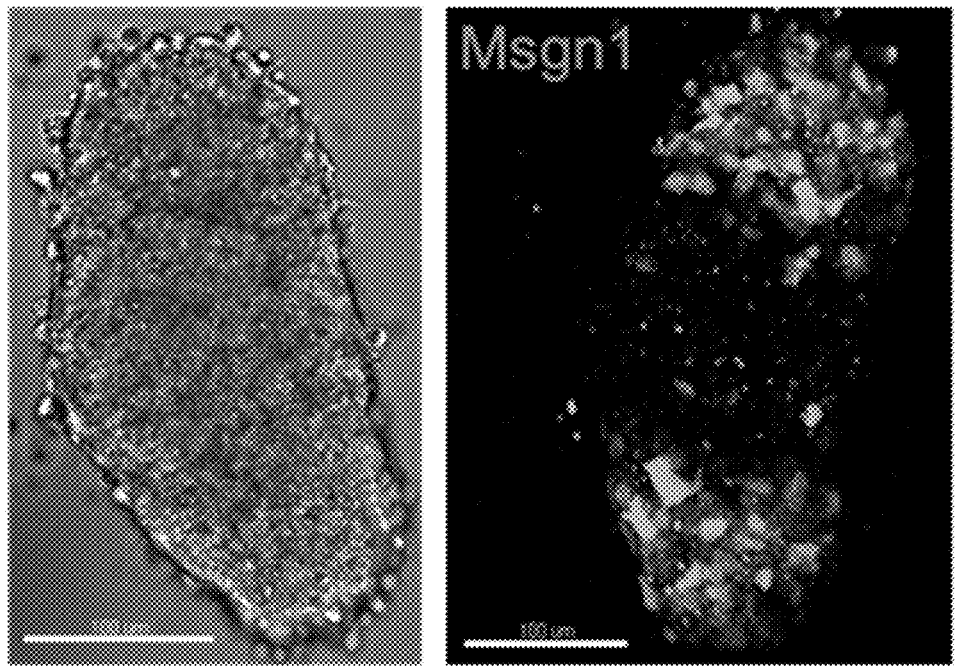
FIG. 2C represents a two-cluster elongated organoid: Msgn1+ cells migrate to form two clusters.
Figure 2D:
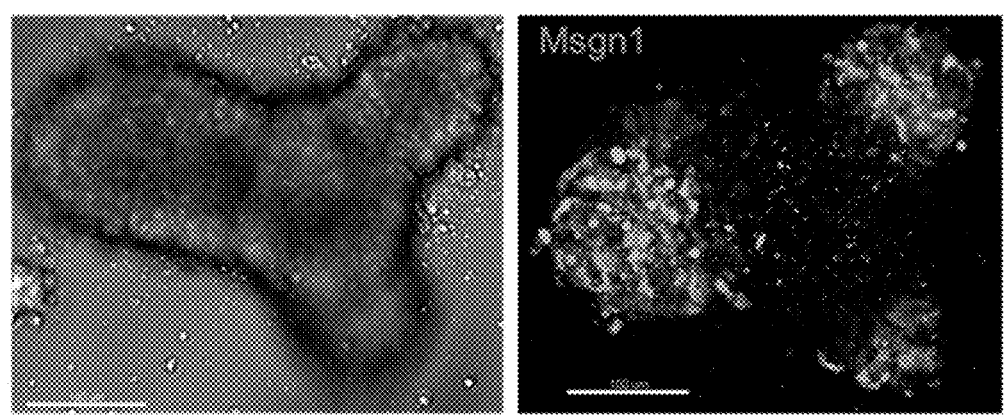
FIG. 2D represents a three-cluster organoid: Msgn1+ cells migrate to form three clusters, all extending from the organoid's core.
Figure 2E:
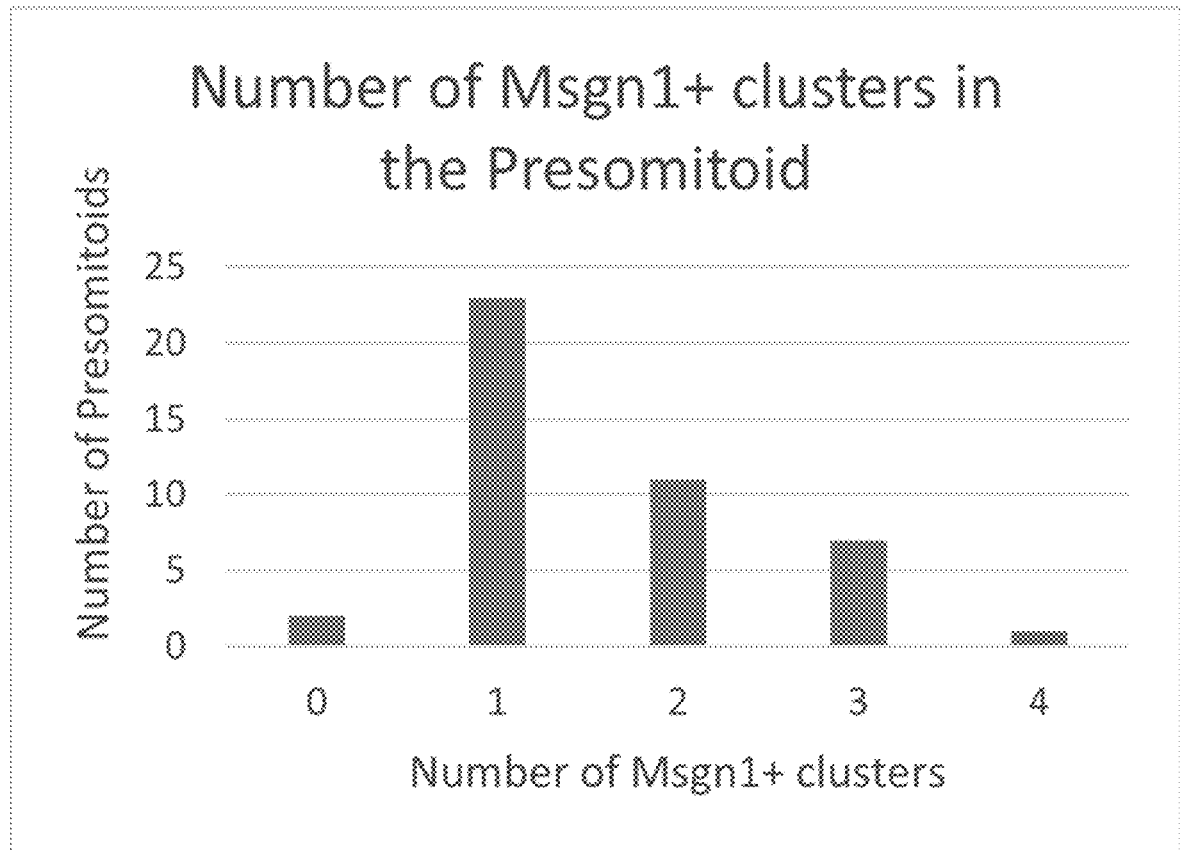
FIG. 2E represents a histogram of the number of Msgn1+ clusters per organoid.

One up to two days after the first PSM cells appear, the morphology of the aggregates changed from circular, round spheres, to ovoid, in parallel to the maturation of the paraxial mesoderm (e.g. FIG. 2A middle panel, FIG. 2C and FIG. 2F). The PSM cells at this stage migrated and aggregated in one (or several) poles (also termed 'PSM polarization') within the aggregate (e.g. FIGS. 2A and 2D, bright regions).

Once the aggregates morphology changes from round sphere to ovoid-like morphology low percentage of extra cellular matrix (ECM), such as 5-10% Matrigel, or one of the following ECM components (fibronectin, collagen, and/or laminin) was added. Optionally, one or more of the following, may be added to the medium 12-24 hours after the onset of the mesodermal cells:

(a) Nodal inhibitor (e.g. 5-15 µM SB-431542).
(b) Wnt activator (e.g. Chir99201 or Rspo3) at high concentration, typically within the range of 3 µM to 9 µM, and 20-60 ng/ml, respectively.
(c) BMP inhibitor (e.g. LDN193189 or Noggin).

Figures 3A, 3B:
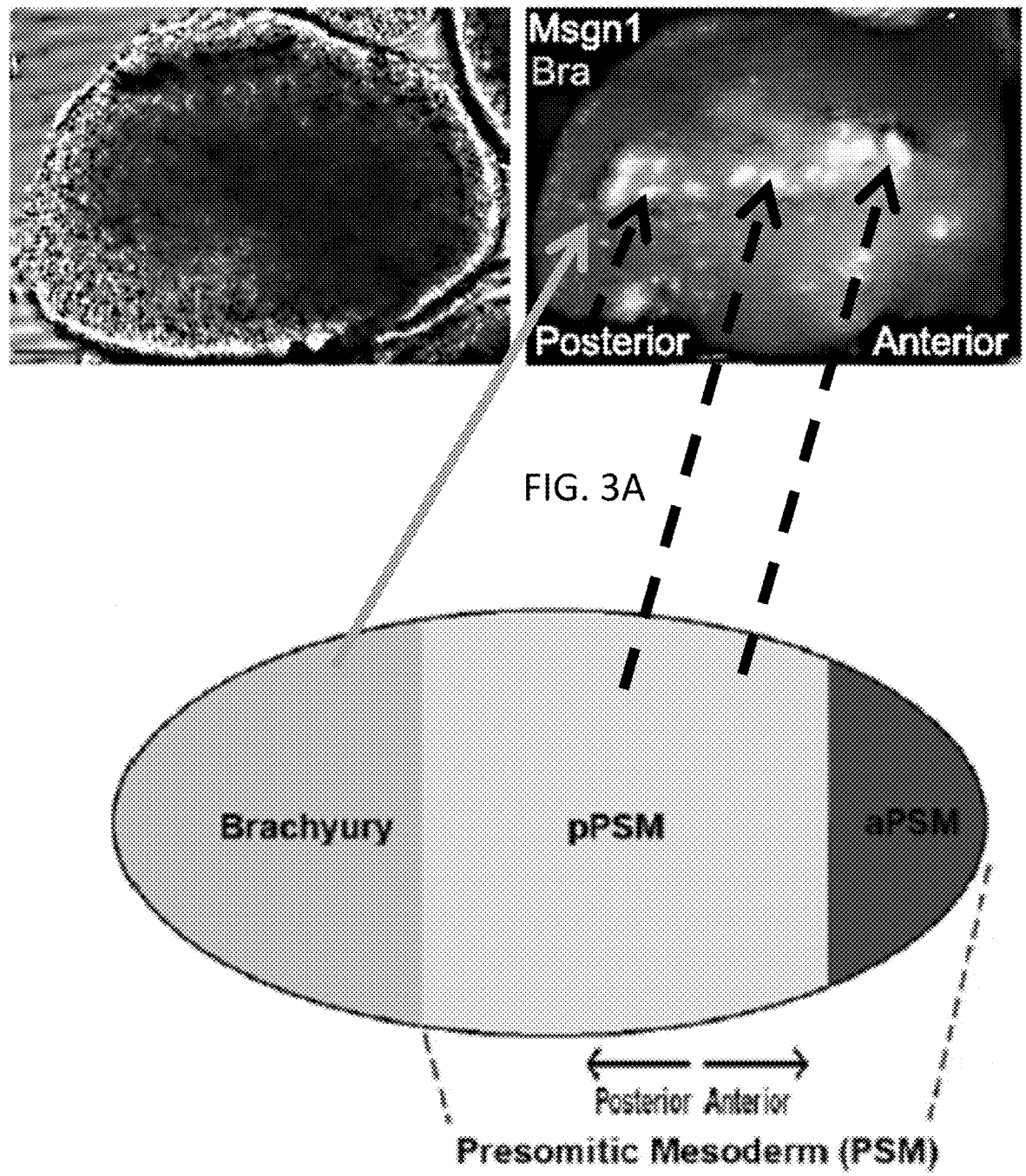
FIG. 3A represents Day-5 organoid formed during Step 3, fixed and immunostained for Brachyury (located on the left/posterior pole, marked by grey arrow), where Msgn1-YFP marks pPSM (bright regions, marked by dashed arrows).
FIG. 3B is a schematic description of the organoid shown in FIG. 3A, comprising Brachyury-positive cells at the posterior pole, Msgn1-positive pPSM cells and anterior pre-somitic mesoderm (aPSM) cells at the anterior pole.
Figure 3C:
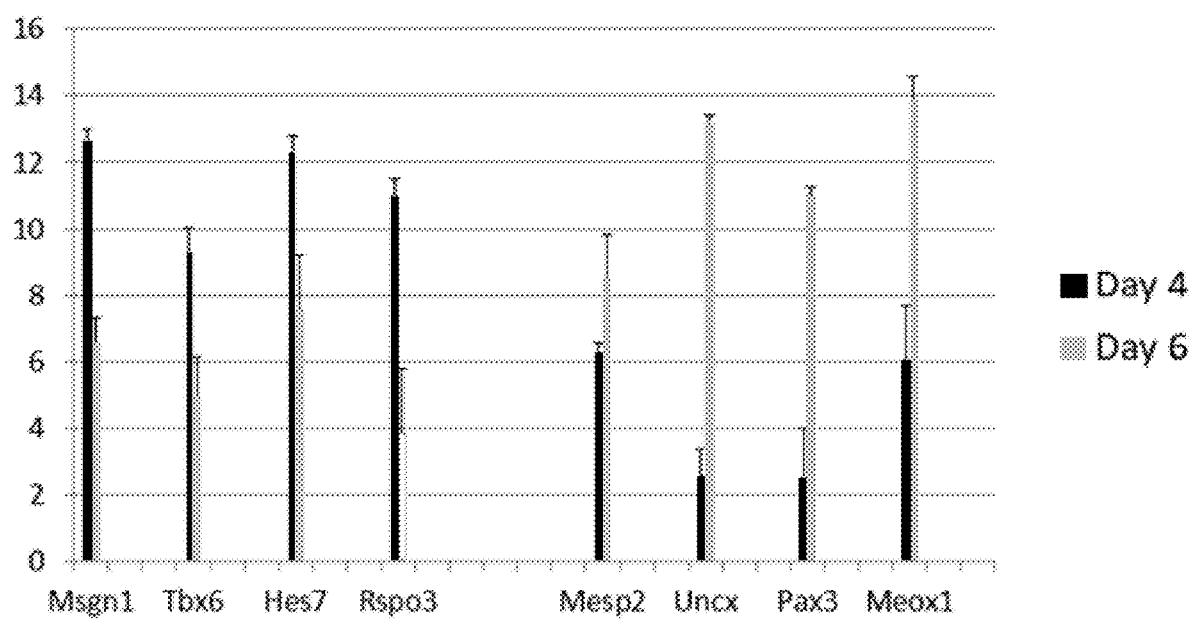
FIG. 3C represents delta CT mean of pPSM associated genes on Day 4 (black columns) and Day 6 (grey columns) of differentiation of mESC derived organoids towards PSM.
Figure 3D:
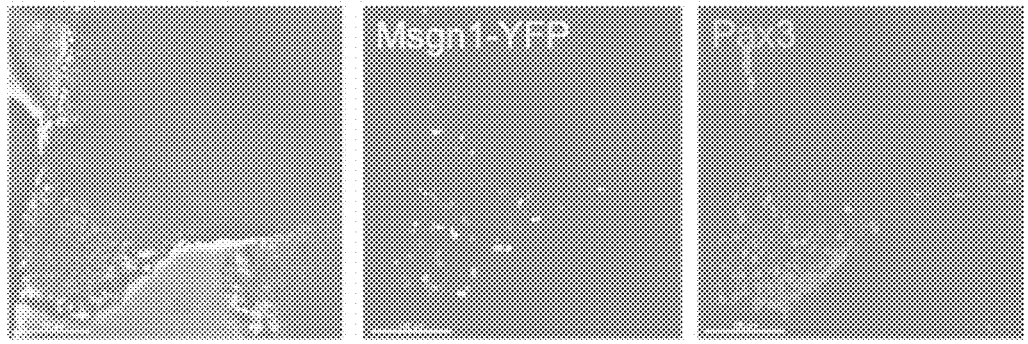
FIG. 3D represents exemplary images of Msgn1-YFP mESC organoids (middle panel) immunostained for Pax3 (right panel), on Day 6 of differentiation. Scale bar 100 µm.
Figure 3E:
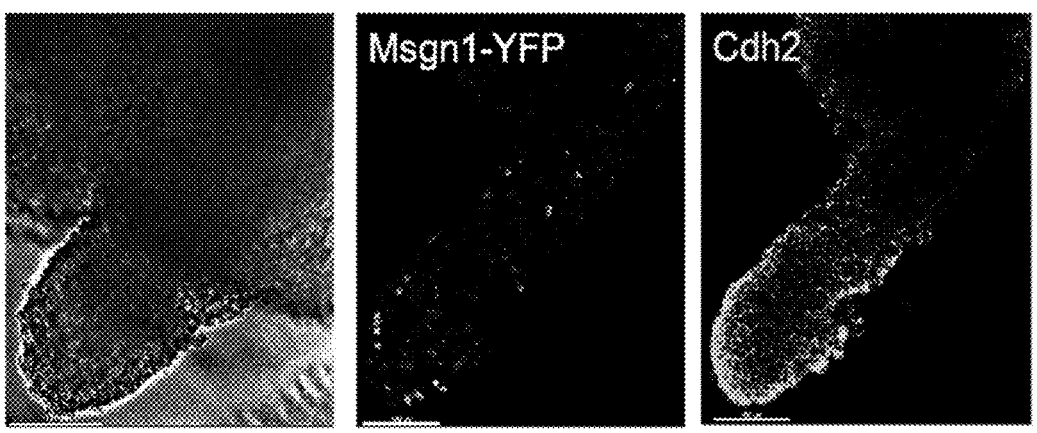
FIG. 3E represents exemplary images of Msgn1-YFP mESC organoids (middle panel) immunostained for N-cadherin (Cdh2; right panel), on Day 6 of differentiation. Scale bar 100 µm.
Figure 6A:
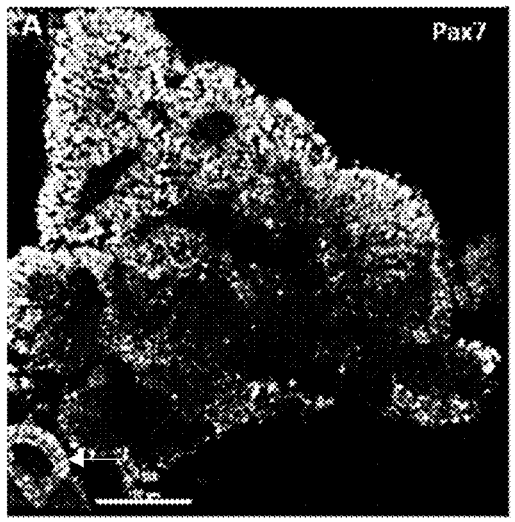
FIG. 6A represents image of aggregates obtained at the end of Step 5, stained with myogenic progenitor marker—Pax7 (bright regions at the upper half of the aggregate) and Sox17-RFP positive endoderm region (bottom left, marked by white arrows). Scale bar 100 µm.
Figure 6B:
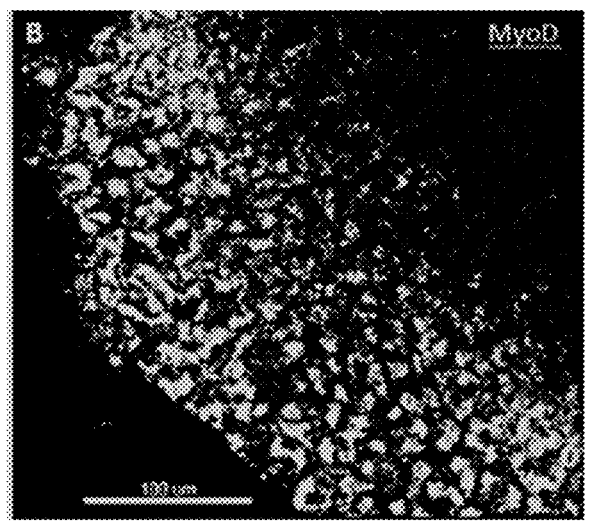
FIG. 6B represents image of aggregates obtained at the end of Step 5, stained with myoblasts marker—MyoD (bright regions). Scale bar 100 µm.
Figure 6C:
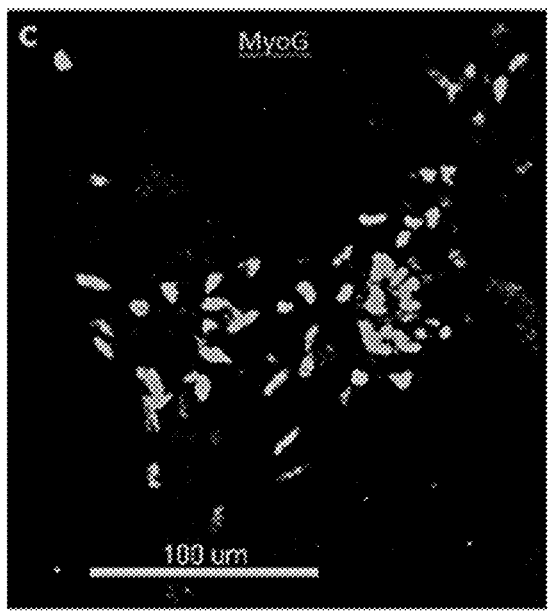
FIG. 6C represents image of aggregates obtained at the end of Step 5, stained with myocytes marker—MyoG (bright regions). Scale bar 100 µm.
Figure 6D:
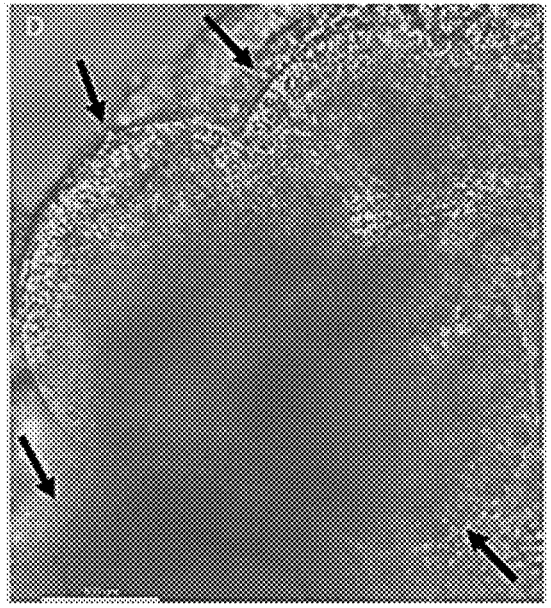
FIG. 6D represents image of mature somites, where black arrows point at representative somites. Scale bar 100 µm.

Step 3B—PSM maturation and formation of anterior pre-somitic mesoderm (aPSM) cells, that are Pax3-positive, take place in parallel to the aforementioned (Step 3A) PSM polarization. The aPSM cells were generated at the anterior pole of the PSM domain within the aggregate (e.g. FIGS. 3A and 3B). These cells are capable of giving rise to somites and later on to myogenic progenitors.

Step 4—somites formation and axis elongation: ECM (or ECM components) were removed from the medium about 1 or 2 days after the formed paraxial mesoderm aggregates were fully elongated and included somite-like structures (which are numbered and pointed at in FIGS. 5A-5B and 5D, respectively). It is noted that ECM removal is optional. It is further noted that the morphological change from round spheres (e.g., FIG. 1A), through ovoid shape (e.g. FIG. 2C) into the elongated shape shown in FIGS. 5A-5D indicates that the protocol disclosed herein resembles embryonic development.

Step 5—myogenic progenitor formation: about 1-2 days after the formation of somites-like structures low concentrations of one or more of the following growth factors (GFs) were added to the medium: 10 ng/ml HGF, 2 ng/ml IGF, 20 ng/ml FGF2. Optionally, the GFs are added alone or in combination with one or more of BMP inhibitor, Wnt activator and ECM as mentioned in previous steps.

At the end of this step, about 1-2 days after the addition of GFs, myogenic progenitors, such as myoblasts, myocytes and others were visible in the mature somites (FIGS. 6A-6D).

The culture medium was refreshed every other day throughout the protocol.

Example 2: Spatial Expression of Stage-Specific Markers for Paraxial Mesoderm Differentiation The molecular and cellular properties of the in-vitro model were compared to embryo. This comparison is crucial as neighboring cell layers provide essential signaling and mechanical support for muscle tissue formation.

To this end, the spatial expression of stage-specific markers for paraxial mesoderm differentiation (Brachyury/T, Msgn1, Pax3, Mesp2, Meox1), somites (Uncx, Tbx18), muscle progenitors (Pax7), Myocytes (MyoG) and mature muscle cells (fast MHC) were characterized. This was done using existing fluorescent live marker cell lines such as, Brachyury, Msgn1, Pax3, Pax7, MyoG, or immunostaining with marker-specific antibodies.

A spatial mRNA expression map at different stages, for an extended set of genes pre-selected for each stage, is also obtained using fluorescent in-situ hybridization (FISH). This method is essential for genes for which there are no validated antibodies. This becomes critical in non-model organisms such as cow or chicken, where antibody availability is particularly limited.

While this invention has been disclosed with reference to specific embodiments, it is apparent that other embodiments and variations of this invention may be devised by others skilled in the art without departing from the true spirit and scope of the invention. The appended claims are intended to be construed to include all such embodiments and equivalent variations.

Unless otherwise defined, all technical and scientific terms used herein have the same meaning as commonly understood by one of ordinary skill in the art to which this disclosure pertains. In case of conflict, the patent specification, including definitions, governs. As used herein, the indefinite articles "a" and "an" mean "at least one" or "one or more" unless the context clearly dictates otherwise.

The invention claimed is:

1. A method for generating somites, the method comprising:
   (a) suspending embryonic stem cells in culture medium to obtain spheric aggregates;
   (b) adding to the culture medium at least one Wnt activator to obtain aggregates comprising mesodermal and endodermal cells;
   (c) removing the Wnt activator;
   (d) identifying pre-somitic mesoderm (PSM) cells having a Mesogenin1 (Msgn1) marker in the aggregates comprising the mesodermal and endodermal cells, and adding extracellular matrix or components thereof when said PSM cells accumulate at poles of the aggregate, to obtain aggregates comprising paraxial mesoderm; and
   (e) incubating the aggregates of step (d), for 10 to 48 hours, thereby obtaining aggregates comprising a plurality of somites,
   wherein said embryonic stem cells are selected from the group consisting of human and mouse embryonic stem cells.

2. The method according to claim 1, further comprising adding to the culture medium of step (a) one or more of insulin, Knock-out Serum Replacement, transferrin-selenium and BMP4.

3. The method according to claim 1, wherein the Wnt activator is selected from the group consisting of: Chir99021, Wnt3a and Rspo3.

4. The method according to claim 1, wherein said adding to the culture medium at least one Wnt activator is carried out within 12 to 36 hours after obtaining said spheric aggregates.

5. The method according to claim 1, wherein said removing the Wnt activator is carried out within the range of 8 to 36 hours.

6. The method according to claim 1, further comprising adding at least one Nodal inhibitor to the culture medium following appearance of the aggregates comprising said mesodermal and endodermal cells.

7. The method according to claim 1, wherein the amount of the extracellular matrix or components thereof is within the range of 1 to 15% vol/vol.

8. The method according to claim 1, further comprising adding in step (d) at least one compound selected from the group consisting of: Wnt activator and BMP inhibitor.

9. The method according to claim 1, further comprising removing the extracellular matrix or components thereof, following said obtaining the plurality of somites.

10. The method of claim 1, comprising a further step after step (e), the further step comprising adding one or more growth factors to the medium, the concentration of the growth factors being below 30 ng/ml, thereby generating myogenic progenitors.

11. The method according to claim 10, wherein the one or more growth factors include HGF, IGF and/or FGF2.

12. The method according to claim 10, wherein the concentration of each growth factor is within the range of 1 to 25 ng/ml.

* * * * *